Patented Aug. 20, 1946

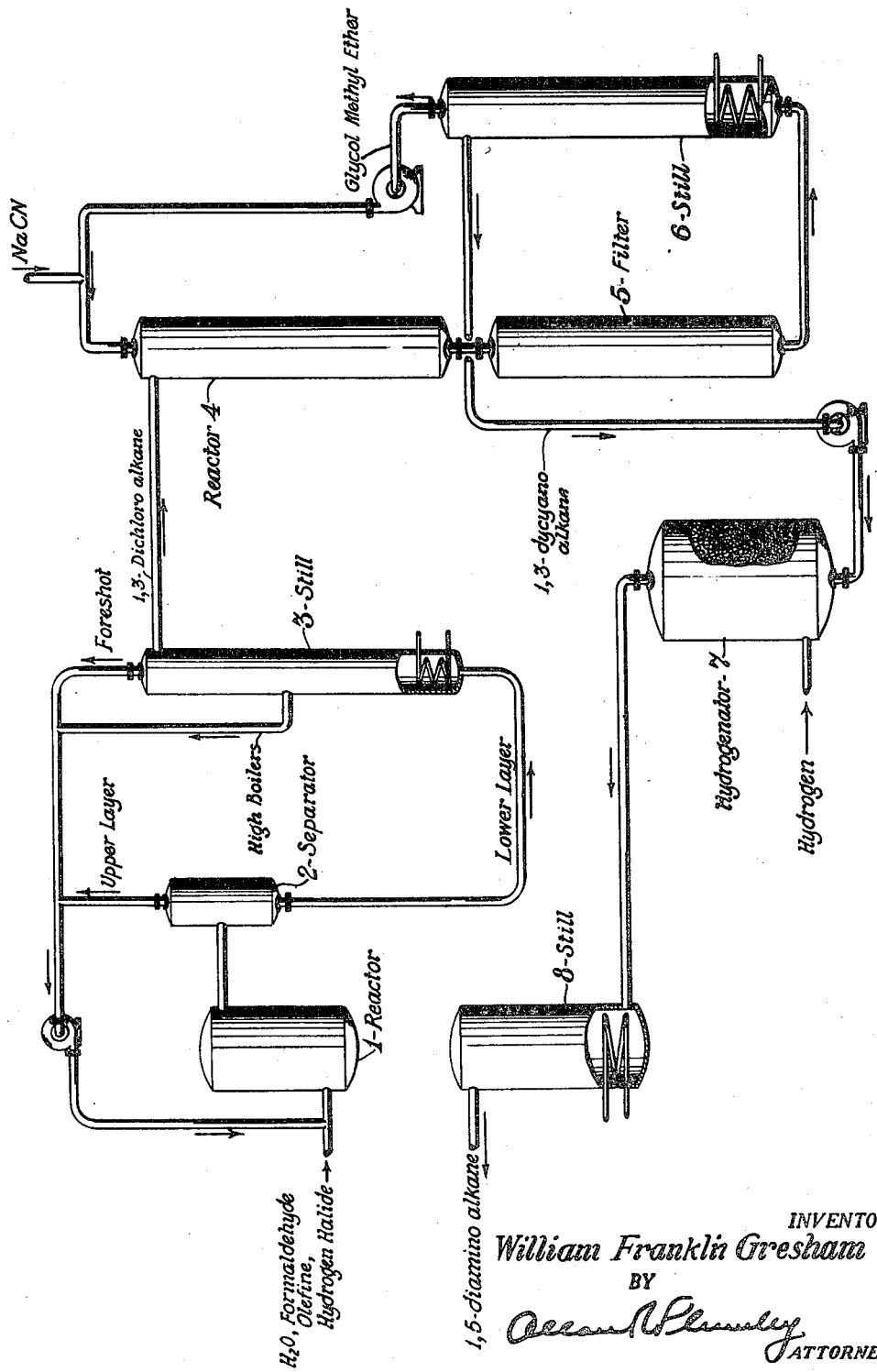

2,405,948

UNITED STATES PATENT OFFICE 2,405,948

PREPARATION OF DIHALOALKANES AND RELATED PRODUCTS

William Franklin Gresham, Wilmington, Del., assignor to E. I. du Pont de Nemours & Company, Wilmington, Del., a corporation of Delaware Application January 26, 1944, Serial No. 519,736

4 Claims. (Cl. 260—659)

This invention relates to the preparation of organic compounds which are useful as intermediates in the manufacture of polyamide resins. More particularly this invention pertains to a novel process for making 1,3-dihaloalkanes and other substituted alkanes to be hereinafter described.

In the manufacture of diamines for use in polyamide resins, it has been necessary in the past to employ comparatively expensive materials, such as adipic acid, glutaric acid and the like. One reason for this has been the necessity for a high standard of purity in these polyamide intermediates (cf. U. S. 2,130,947). Conventional methods of introducing substituents into acyclic hydrocarbons in many instances were thus precluded, as indeed were all other procedures which gave rise to difficultly separable products.

It is an object of this invention to provide a process for the preparation of 1,3-dihaloalkanes, and their derivatives, including 1,5-diaminoalkanes from inexpensive and readily available materials. Another object is to provide a process for the synthesis of intermediates, such as 1,3-dihaloalkanes, which are of value in the manufacture of polyamide resins.

These and other objects are accomplished in accordance with this invention by means of a coacting series of operations which are best understood by reference to the diagrammatic drawing. The process shown diagrammatically represents one embodiment of the present invention. Reactor 1 is a vessel wherein formaldehyde, an olefine, water and a hydrogen halide react to produce a product containing appreciable amounts of 1,3-dihaloalkane. In a continuous process, this reaction mixture is withdrawn and passes to the separator 2, in which the product separates into two layers. The upper layer is continuously returned to the reactor 1, and the lower layer passes to the still 3 which yields three fractions, viz., a foreshot, a 1,3-dihaloalkane fraction, and a fraction (later to be described) which is higher boiling than the 1,3-dihaloalkane. The foreshot and high boilers are combined and returned to the reactor I, while the 1,3-dichloroalkane is forwarded to the reactor 4, in which it is converted to dicyanoalkane as hereinafter described. The dicyanoalkane may thereafter be hydrogenated to produce 1,5-diaminoalkane of quality suitable for use as a polyamide intermediate.

The reaction which takes place in reactor I is the formation of 1,3-dihaloalkane from an olefine, formaldehyde and hydrogen halide. The olefines which may be used include ethylene, propylene, isobutylene, butenes, cyclohexene, styrene, and the like. Good results are obtained with ethylene, and with propylene. It is of interest to note that ethylene, which does not react with formaldehyde to form condensation products such as 1,3-dioxane as readily as do other olefines, reacts very satisfactorily with formaldehyde and a hydrogen halide to form a 1,3-dihaloalkane.

The reaction between an olefine, formaldehyde and hydrogen halide may be carried out in an aqueous medium, as shown in the drawing, or in the presence of non-aqueous solvents. Catalysts such as metal halides may be employed but they are generally unnecessary. The hydrogen halide may be hydrogen chloride, bromide or iodide, preferably hydrogen chloride. Formaldehyde may be introduced as "formaldehyde compound," which term is defined to embrace monomeric formaldehyde, formalin, paraformaldehyde, trioxane or other formaldehyde polymer, chlorhydrin formals, cyclic formals and the like. Temperatures in the range of from 20° to 200° C. are suitable for the reaction between olefine, formaldehyde and hydrogen halide, although the preferred temperature is within the range of 50° to 175° C. Pressures of from 1 to 1000 atmospheres may be employed. Superatmospheric pressures are particularly helpful when the olefine contains two to four carbon atoms. When propylene is the olefine reactant, a pressure of 100 to 800 atmospheres is suitable. Comparatively high pressures (exceeding 450 atmospheres) are preferred when the olefine reactant is ethylene. Lower pressures (ca. 20 to 450 atmospheres) result in the formation of chlorhydrins, and other products. At the high pressures, formation of 1,3-dihaloalkane is rapid, the time required for the reaction being frequently only a few minutes, and usually not more than about one hour. The reaction takes place in accordance with the following equation:

$$R_1R_2C=CR_3R_4 + CH_2O + 2HX \rightarrow X(R_1R_2C-CR_3R_4)CH_2X + H_2O$$

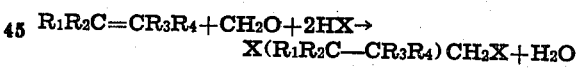

$R_1$, $R_2$, $R_3$ and $R_4$ being hydrogen or hydrocarbon groups, and X being halogen. Preferably the reaction is carried out in a pressure-resistant vessel such as a silver-lined autoclave, although reactors made of or lined with other non-corrosive materials such as glass, ferro-silicon alloys, resins, noble metals and the like also may be used.

When the reaction between an olefine, formaldehyde and hydrogen halide takes place in an aqueous medium, a product containing two layers is generally obtained. As shown in the diagrammatic drawing, the 1,3-dihaloalkane can be isolated by withdrawing and distilling the lower layer. The remainder of the product, including any unreacted formaldehyde or other formaldehyde compound in the upper layer, may be recycled to the reactor in which olefine, formaldehyde and hydrochloric acid are reacting. An alternative method of isolating the 1,3-dihaloalkane is by steam distillation of the reaction product, accompanied by returning the upper layer of the distillate to the distillation vessel. In the synthesis of 1,3-dichloropropane from ethylene, formaldehyde and hydrogen chloride (pressure, 900 atmospheres; temperature, 150° C.; reaction time, 60 minutes) the conversion to 1,3-dichloropropane is 35 to 40%.

Under comparatively mild conditions, the reaction between an olefine, formaldehyde and hydrochloric acid tends to yield relatively smaller amounts of 1,3-dichloroalkane, together with appreciable amounts of higher boiling products including chloroethers and chlorohydrin formals. Thus, at temperatures of 80° to 90° C., and at pressures of less than 450 atmospheres, ethylene reacts with formaldehyde and aqueous hydrochloric acid to give a product which, upon treatment with methanol to remove combined formaldehyde from the trimethylene chlorhydrin formal which is present, yields trimethylene chlorhydrin in about 18% conversion. If desired, this trimethylene chlorhydrin may be converted to 1,3-dihaloalkane in a separate step. The formation of ethers, halohydrins and halohydrin formals can be suppressed by reacting the olefine, hydrogen halide and formaldehyde at sufficiently high temperature and pressure, and by employing a sufficiently high proportion of hydrogen halide to formaldehyde in the initial reaction mixture. The molal ratio of hydrogen halide to formaldehyde in the initial reaction mixture should be between 1.0 and 3.0. An excess of hydrogen halide over the stoichiometrically required amount is not generally necessary, particularly at temperatures above 100° C.

If desired, the invention may be practiced in combination with appropriate operations for converting the 1,3-dihaloalkanes to 1,5-diaminoalkanes as illustrated in the drawing. This can be accomplished by heating the dihaloalkane with a metal cyanide in an inert solvent (preferably glycol methyl ether) followed by removal of the resultant metal halide, and hydrogenation of the dicyanoalkane thus produced.

The invention is illustrated further by means of the following examples.

*Example 1.—Preparation of 1,3-dichlorobutane and 2-methyl-1,5-diaminopentane*

A mixture containing 84.0 grams of propylene, 96.5 grams of concentrated hydrochloric acid, 45 grams of paraformaldehyde and 54 grams of dry hydrogen chloride is processed in an agitated silver-lined autoclave at 150° to 161° C., under an autogenous pressure of 200 atmospheres, for one hour. These quantities correspond to an initial molar ratio of hydrogen chloride to formaldehyde of 1.65:1. The reaction product is withdrawn from the autoclave, and diluted with an approximately equal volume of water. After neutralization of the mixture, the oil layer is separated and distilled through a Vigreaux column, whereby a distillate containing 45.7 grams of 1,3-dichlorobutane (B. P. 132° C.) is obtained. To this 1,3-dichlorobutane is added 39 grams sodium cyanide and 86.5 grams glycol methyl ether, and the resulting mixture is processed in a silver-lined autoclave at 159° to 163° C. under 35 to 40 pounds per sq. in. pressure for one hour. The reaction mixture is withdrawn, filtered and distilled, yielding 13.7 grams of 1,3-dicyanobutane (B. P. 70° C., at 1 mm.) and 10.5 grams 1-cyano-3-chlorobutane (B. P. 55° C. at 2 mm.). The 13.7 grams of 1,3-dicyanobutane is thereafter hydrogenated in the presence of 23 grams of alkali-free cobalt catalyst and 69 grams of ammonia, at a temperature of 80° C. under 700 atmospheres pressure, yielding 11.6 grams of 2-methyl-1,5-diaminopentane (B. P. 78° at 11 mm.; neutralization equivalent, 58.5; refractive index, at 25° C. 1.4585).

*Example 2.—Preparation of 1,3-dichloropropane*

A mixture containing 193 grams concentrated hydrochloric acid and 31.7 grams paraformaldehyde is processed with ethylene under 735 to 925 atmospheres pressure in an agitated silver-lined autoclave for one hour at 149 to 154° C. These quantities correspond to an initial molar ratio of hydrogen chloride to formaldehyde of 1.85:1. The product is withdrawn, and the upper layer is set aside as "recycle mixture" to be used later (cf. Example 3) in preparing an additional quantity of 1,3-dichloropropane. The lower layer, consisting of crude 1,3-dichloropropane is distilled, yielding in addition to a small amount of foreshot and a higher boiling fraction. 25.4 grams of 1,3-dichloropropane (B. P. 59° at 94 mm.).

*Example 3.—Preparation of 1,3-dichloropropane*

The "recycle mixture" prepared as described in Example 2 is combined with the foreshot and the fraction higher boiling than 1,3-dichloropropane (cf. Example 2), and to the mixture is added 24.6 grams of formaldehyde and 41.9 grams of hydrogen chloride gas. This reaction mixture is processed for one hour with ethylene under 720 to 820 atmospheres, at a temperature of 150° to 160° C. The product is discharged from the autoclave into a receiver connected in series with a cold trap (−80° C.), for preventing escape of ethyl chloride. The cold trap contents (11.4 grams) are discarded. The oil layer in the receiver is withdrawn, and upon distillation yields 34.8 grams of 1,3-dichloropropane (B. P. 60–63° C. at 100 mm.).

It is to be understood that many other different embodiments of this invention may be made without departing from the spirit and scope thereof. The hydrogenation catalyst, for example, may be on a fixed support, or may be moved in powder form through the hydrogenation mixture. The solvent used in treating the 1,3-dihaloalkane with sodium cyanide may be recovered and recycled, subsequent to the hydrogenation step, instead of immediately preceding the hydrogenation step.

The present invention is not restricted to specific embodiments used as illustrations, but is limited only by the following claims.

I claim:

1. In a process for preparing dihaloalkanes the steps which comprise substantially heating 84 parts by weight of propylene with 96.5 parts of concentrated hydrochloric acid, 45 parts of formaldehyde, and 54 parts of hydrogen chloride, in a pressure-resistant reactor at 150° to 161° C. under a pressure of 200 atmospheres, said formaldehyde having been introduced into the reaction mixture initially in the form of paraformaldehyde, whereby a reaction mixture containing 1,3-dichlorobutane is formed and separating the said 1,3-dichlorobutane from the resultant reaction mixture.

2. In a process for preparing dihaloalkanes the steps which comprise heating ethylene in a pressure resistant vessel with hydrogen halide and formaldehyde, the molal ratio of hydrogen halide to formaldehyde being initially between 1.0 and 3.0, at a temperature within the range of about 50° to 175° C. under a pressure of about 450 to 1000 atmospheres, whereby 1,3-dichloropropane is formed as the chief product of the resulting reaction and separating 1,3-dichloropropane from the resulting reaction mixture.

3. In a process for preparing dihaloalkanes the steps which comprise heating about 193 parts by weight of concentrated hydrochloric acid and 31.7 parts of paraformaldehyde with ethylene at about 149° to 154° C. under a pressure of 735 to 925 atmospheres whereby 1,3-dichloropropane is formed as the chief product of the resulting reaction and separating 1,3-dichloropropane from the resulting reaction mixture.

4. In a process for preparing dihaloalkanes, the steps which comprise heating an olefin having from 2 to 4 carbon atoms per molecule with a hydrogen halide and formaldehyde, the molar ratio of hydrogen halide to formaldehyde being initially from 1.65:1 to 3:1, at a temperature within the range of about 50° to 175° C. under a pressure of from 20 to 1,000 atmospheres, continuing the said heating until a mixture of 1,3-dihaloalkane and halohydrin formal is produced, and separating the said 1,3-dihaloalkane from the resulting reaction mixture.

WILLIAM FRANKLIN GRESHAM.